United States Patent [19]

Burtscher

[11] 4,402,472

[45] Sep. 6, 1983

[54] DEVICE FOR WINDING AND REELING AN ELONGATED FLEXIBLE MEMBER

[76] Inventor: Paul Burtscher, Bühlwiesenstrasse 25, Dübendorf, Switzerland

[21] Appl. No.: 166,192

[22] Filed: Jul. 7, 1980

[30] Foreign Application Priority Data

Jul. 6, 1979 [CH] Switzerland .................. 6352/79

[51] Int. Cl.³ ............................................ B65H 75/48
[52] U.S. Cl. .................. 242/107.2; 242/107; 74/802; 185/37
[58] Field of Search ..................... 242/107–107.7; 185/37, 39; 74/802, 781 R

[56] References Cited

U.S. PATENT DOCUMENTS

| | | | |
|---|---|---|---|
| 348,805 | 9/1886 | Wheeler | 242/107.3 |
| 2,151,130 | 3/1939 | Mattsson et al. | 242/107.3 |
| 2,587,308 | 2/1952 | Gilette | 242/107.5 |
| 2,622,706 | 12/1952 | Turner | 242/107.2 X |
| 2,673,611 | 3/1954 | Seybold | 74/802 |
| 2,684,534 | 7/1954 | Ljungberg | 242/107.2 X |
| 3,049,317 | 8/1962 | Kessler | 242/107 |
| 3,376,648 | 4/1968 | Ljungberg | 242/107.12 X |
| 3,435,529 | 4/1969 | Quenot | 242/107.2 X |
| 3,448,828 | 6/1969 | Goldberg | 74/802 X |
| 3,578,259 | 5/1971 | Zelnick | 242/107.2 |
| 3,972,659 | 8/1976 | Bosch et al. | 74/802 X |

Primary Examiner—John M. Jillions

Attorney, Agent, or Firm—Anthony A. O'Brien

[57] ABSTRACT

A winding and reeling device for an elongated, flexible member. A reel is connected to the outer end of a spiral spring. The outer end of the spiral spring is rigidly connected to the reel, whereby a gear is connected between the outer and the inner end of the spiral spring such that upon rotation of the outer end of the spiral spring around its center axis the inner end of the spiral spring rotates around the same axis, however at a slower rotational speed. The reel has smooth surfaces and comprises at no place any gear teeth. A rotation of the reel causes the rotation of the gear wheels of the gear, whereby two gear wheels having a different number of teeth are rigidly connected to each other and arranged on a common shaft. A further shaft is provided which carries two further gear wheels, whereby one gear wheel is rigidly connected to the further shaft and the other gear wheel is freely rotatable on said further shaft. The gear is a speed reduction gear, whereby its input end is driven by the reel and its output end drives the inner end of the spiral spring. Accordingly, the space occupied by the spiral spring is smaller than hitherto possible, and a space saving of the entire device is achieved. The device is suitable for reeling weblike members such as measuring tapes or leashes for dogs and also for reeling electrical cables such as for instance used in vacuum cleaners.

6 Claims, 5 Drawing Figures

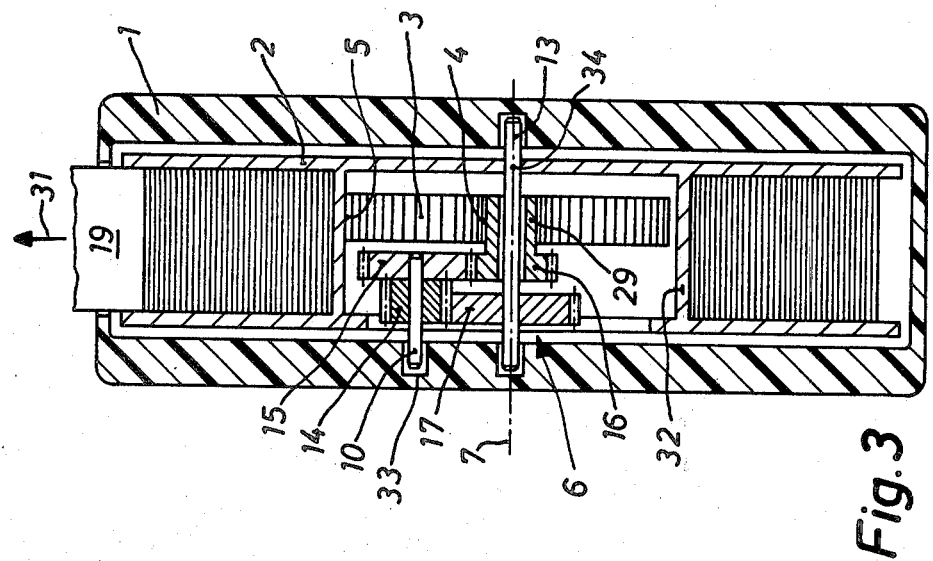
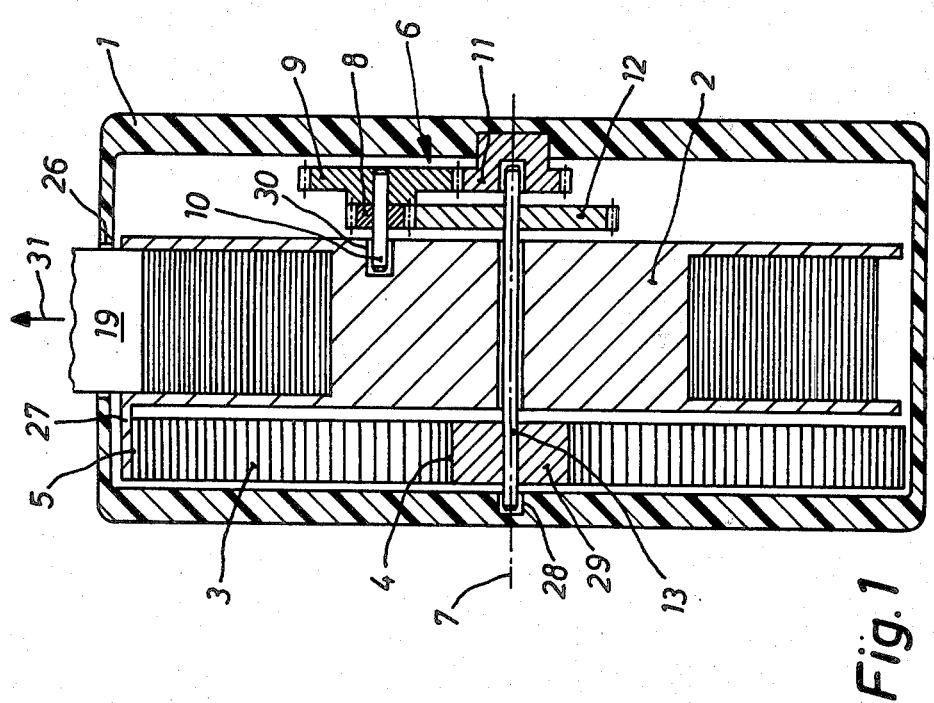
Fig. 3
Fig. 1

DEVICE FOR WINDING AND REELING AN ELONGATED FLEXIBLE MEMBER

BACKGROUND OF THE INVENTION

1. Field of the Invention

The present invention relates to a winding and reeling device for an elongated, flexible member, including a casing and a reel means arranged in said casing, including further a spiral spring adapted to rotationally bias said reel means in its take-up rotational direction, which said spiral spring is provided with an inner end and an outer end, which said outer end of said spiral spring is connected to said reel means and which said inner end of said spiral spring is connected by the intermediary of a gear means to said outer end of said spiral spring, whereby said gear means causes upon rotation of said outer end of said spiral spring around its center axis at a first rotational speed said inner end of said spiral spring to rotate around said center axis with a second, slower rotational speed.

2. Description of the Prior Art

Such devices which are provided with a spiral spring biassing a reel are commonly known. Known are for instance applications comprising measuring tapes, leashes for dogs and also electrical cables which can be wound on a reel such as for instance in vacuum cleaners for domestic application.

It is generally known that commonly available spiral springs specifically such spiral springs used for above mentioned applications feature a certain relationship regarding an optimal application thereof between the space occupied by the released spring and the space occupied by the material of the spring itself, that is if such spring is wound that all its turns contact each other. The relationship is such that the space occupied by the material as such of the spring (if the spring is completely tightened that all its turns touch itself) amounts to for instance one-third of such space which is occupied by the released spring such for instance in the spring casing. Consequently, the casing for the spring must comprise an increasingly larger space or volume, the larger the length of the member is which is to be wound upon the reel. Obviously, the casing for the spring occupies a considerable volume by long weblike members such as measuring tapes, such that its volume and weight will be considerably large resulting in a difficult handling of such device.

SUMMARY OF THE INVENTION

Hence, it is a general object of the present invention to provide a reeling device which occupies a minimal volume and yet allows a storing or reeling of large tape- or weblike members.

Now in order to implement this and still further objects of the invention, which will become more readily apparent as the description proceeds, the winding and reeling device of this development is manifested by the features of comprising the provision of a toothless reel means having smooth surfaces, wherein gear means comprises two spur gear wheels arranged on a common shaft and rigidly connected to each other, which spur gear wheels have each a different number of teeth and are drivably connected to said reel means and wherein said shaft is located within the core of spool of said reel means.

A further object is the provision of a toothless reel means having smooth surfaces; a first spur gear wheel, a second spur gear wheel, a third spur gear wheel, a fourth spur gear wheel; a common shaft supporting said first and second gear wheels which are rigidly connected to each other, which common shaft is rotatably supported in said reel means at a location remote from its center axis but within the core or spool of said reel, which said third gear is rigidly connected to said casing and meshes with said second gear wheel; a further shaft rotatably supporting said reel means and rotatably supported in said third gear wheel and connected to the inner end of a spiral spring, which fourth gear wheel is rigidly connected to said further shaft; wherein said first gear wheel and said third gear wheel comprise a same, first number of teeth, and said second gear wheel and said fourth gear wheel comprise a same, second number of teeth, and wherein the second number is larger than the first number.

Yet a further object is to provide a reeling and winding device comprising the provision of a toothless reel means having smooth surfaces; a first spur gear wheel, a second spur gear wheel, a third spur gear wheel, a fourth spur gear wheel; a common shaft supporting said first and said second gear wheel, which two gear wheels are rigidly connected to each other and which common shaft is rotatably supported in said casing at a location remote from said center axis; a further shaft, rotatably supported at both its ends in said casing and rigidly connected to said reel means, a third spur gear wheel connected to the inner end of the spiral spring, rotatably supported by said further shaft and meshing with said second gear wheel; a fourth spur gear wheel connected to said further shaft and meshing with said first gear wheel; wherein said first gear wheel and said second gear wheel comprise a same, first number of teeth, and said second gear wheel and said fourth gear wheel comprise the same, second number of teeth, and wherein the second number is larger than the first number.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 is a sectional view through a first embodiment including a first arrangement of a gear;

FIG. 3 is a sectional view through a further embodiment having a gear arrangement which differs from the one shown in FIG. 1;

DETAILED DESCRIPTION OF THE PREFERRED EMBODIMENTS

Figure 2:
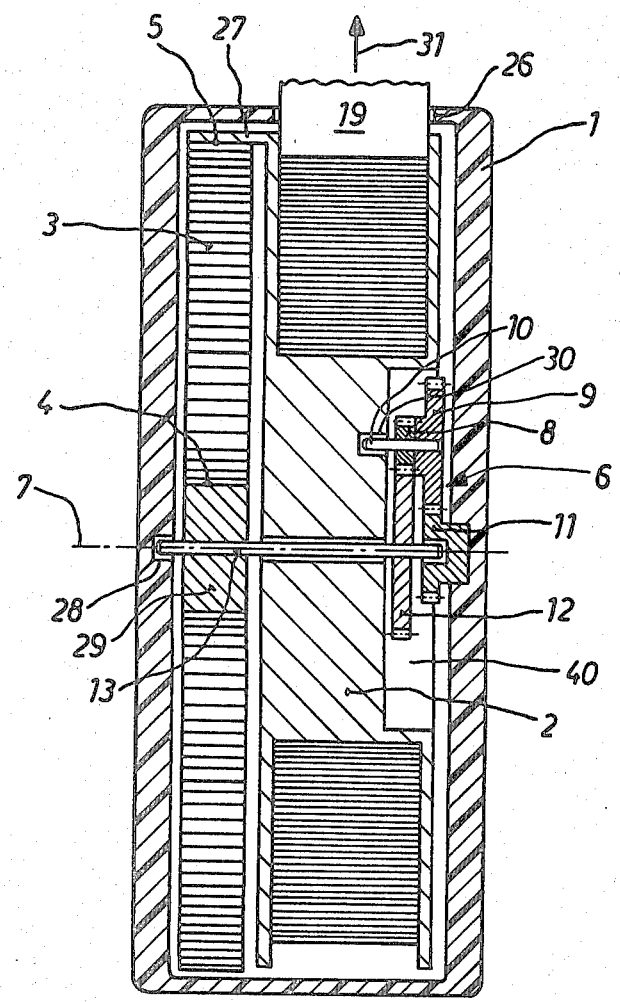
FIG. 2 is a sectional view through an embodiment similar to the embodiment of FIG. 1, whereby, however, the gear is arranged within the reel spool.

Describing now the drawings, and considering initially the exemplary embodiment of the reeling device as shown in FIG. 1 it will be understood that there is provided an elongated, flexible member 19 which is a band or a tape, respectively, such as a leash for dogs or a measuring tape. It is, however, to be noted, that this flexible member can comprise a plurality of linked, stiff bodies such as a chainlike construction. In the introductory portion it has been set forth that this flexible member 19 could also comprise a roughly circular cross-sectional form such as would be the case of electrical lines or cables, respectively. A reel 2 is arranged in the casing 1 and the elongated, flexible member 19 is wound around this reel 2. The casing 1 is completely closed with the exception of an opening 26 made in the top of the casing. The flexible member which is shown in this and in the further embodiments in the form of a tape, is wound around the reel 2 and extends through this opening 26. At a section of the circumference of the reel 2 there is provided a connecting member 27, by which the reel 2 is connected to the outer end 5 of a spiral spring 3 arranged adjacent to the reel 2. This connecting member 27 and the connection between the connecting member 27 and the flexible member 19 are constructed according to known designs, thus well known to the person skilled in the art and not particularly shown in the drawings. The reel 2 is rotatably supported by a shaft 13. This shaft 13 is at its left end (as seen in FIG. 1) rotatably supported at 28 in casing 1 and carries adjacent to said end the hub 29, which is rigidly connected to the inner end 4 of the spiral spring 3. Accordingly, if the reel 2 rotates, the outer end 5 of the spiral spring 3 will rotate around the center axis 7 of the spiral spring 3, which center axis 7 is also the center axis of the shaft 13. A rotation of the shaft 13 causes in turn a rotating of the inner end 4 of the spiral spring 3 around the same center axis 7. A shaft 10 is rotatably supported in the reel 2 in a bearing arrangement which is remote from the central axis 7. This shaft 10 supports a first gear wheel 8 and a second gear wheel 9. These gear wheels are spur gear wheels, whereby all gear wheels shown and described are such spur gear wheels. The first gear wheel 8 is rigidly connected to the second gear wheel 9 and both these gear wheels 8 and 9 are rigidly connected to mentioned shaft 10. According to the arrangement shown, the number of teeth of the first gear wheel 8 is smaller than the number of teeth of the second gear wheel 9. The second gear wheel 9 meshes with a third gear wheel 11, which third gear wheel 11 is rigidly connected to the housing 1. The shaft 13 is rotatably supported at its right end (according to FIG. 1) in the third gear wheel 11.

The first gear wheel 8 meshes with a fourth gear wheel 12. It can be seen that the number of teeth of the third gear wheel 11 is smaller than the number of teeth of the fourth gear wheel 12. This fourth gear wheel 12 in turn is rigidly connected to the shaft 13.

These four gear wheels 8, 9, 11, 12 form together a speed reduction gear identified by the reference numeral 6.

According to a preferred embodiment the first gear wheel 8 comprises 16 teeth, the second gear wheel 9 has 25 teeth, the third gear wheel 11 has 16 teeth and the fourth gear wheel 12 again has 25 teeth. Accordingly, the preferred reducing gear ratio amounts to 0.4096. It must, however, be distinctively noted that this reducing gear ratio is a preferred one and that other gear ratios between 0.99 and 0.01, for instance 0.5, 0.4, 0.6 etc. are also foreseen.

The operation of the embodiment shown in FIG. 1 proceeds as follows: It is assumed, that the tape 19 is pulled in the direction of the arrow 31 such to unreel the tape. Consequently, the reel 2 will rotate on the shaft 13 and around the center axis 7. Accordingly, the bearing arrangement 30 of the first gear wheel 8 and the second gear wheel 9 will be rotated around the same central axis 7 or around the shaft 13. Because now the second gear wheel 9 meshes with the third gear wheel 11, which third gear wheel 11 is rigidly held in casing 1, the second gear wheel 9 rides on the third gear wheel 11. Therefore, the first gear wheel 8 rotates together with the second gear wheel 9 in a rotational direction which is opposite to the rotational direction of rotating reel 2. Now, the first gear wheel 8 meshes with the fourth gear wheel 12. Accordingly, this fourth gear wheel 12 is rotated in a rotational direction which is the same direction in which reel 2 is rotating. Because, however, the four mentioned gear wheels 8, 9, 11, 12 form a speed reduction gear 6, such as explained above, this fourth gear wheel 12 rotates with a rotational speed which is different from the rotational speed with which reel 2 rotates. In the arrangement of the presently shown embodiment the rotational speed of the fourth gear wheel 12 amounts to about half of the rotational speed of reel 2, whereby if the numbers of teeth are those as mentioned above, the ratio of the rotational speeds is 1:0.4096.

The fourth gear wheel 12 which is rigidly connected to shaft 13 causes shaft 13 to rotate together with mentioned hub 29 rigidly connected thereto such that finally the inner end 4 of the spiral spring 3 rotates, which inner end 4 is connected to hub 29. The inner end 4 rotates with the above mentioned rotational speed as well as in a same rotational direction as reel 2. Because now the inner end 4 of the spiral spring 3 goes behind or lags, the outer end 5 thereof, the individual sections of the spiral spring 3 will abut closely each other and lie upon each other in contrast to the known arrangements, according to which the inner end 4 is fixedly held, after a larger number of turns of the reel 2. Conclusively, the reel 2 can carry out more rotations until reaching the tensioned end position of the spiral spring 3. Consequently, the tape 19 can be made much longer, whereby at the same time the volume or space occupied by the spiral spring 3 remains the same. Conversely, it is possible to decrease the space or volume, respectively, occupied by the spiral spring 3 when maintaining a same length of the tape 19, such that the dimensions of the entire device based on the dimensions of the spiral spring 3 can be reduced.

Attention is now drawn to FIG. 2. The embodiment shown in FIG. 2 is with regard to the construction and to operation identically the same as that of the embodiment shown in FIG. 1 with the exception that the gear 6 is no longer arranged at the side adjacent to the reel 2, and rather within the reel 2. To this end, the reel 2 is provided with a recess 40, in which the gear 6 is arranged. Accordingly, a further saving of space is achieved in axial direction of the device. Because the embodiment of FIG. 2 corresponds in all its parts and in the operation to the embodiment of FIG. 1 the embodiment of FIG. 2 being a literal repetition of the embodiment of FIG. 1 is not described.

In FIG. 3 a further embodiment of the invention is shown, whereby structural members corresponding to structural members of FIG. 1 are given the same reference numerals. A reel 2 with a tape 19 wound thereupon is arranged within casing 1. Contrary to the arrangement shown in FIG. 1 the spiral spring 3 is arranged within the reel 2, which results obviously in a considerable saving of space. A web section of reel 2 is connected to the outer end 5 of the spiral spring 3. Furthermore, the reel 2 is connected to a shaft 13, which at both ends is rotatably supported in casing 1. This shaft 13 extends through a third gear wheel 16 and the hub 29 of the spiral spring 3 and is rigidly connected to a fourth gear wheel 17. Furthermore, there is provided a first gear wheel 14, which is rigidly connected to a second gear wheel 15, which two gear wheels 14, 15 in turn are connected to a shaft 10 which is rotatably supported at a bearing arrangement 33 in casing 1. Thereby the fourth gear wheel 17 meshes with the first gear wheel 14. The second gear wheel 15 meshes with the third gear wheel 16, which third gear wheel 16 is rigidly connected to hub 29, which hub 29 in turn is rigidly connected to the inner end 4 of the spiral spring 3. Thereby, the number of teeth of the first gear wheel 14 is smaller than the number of teeth of the second gear wheel 15, and the number of teeth of the third gear wheel 16 is smaller than the number of teeth of the fourth gear wheel 17. The first gear wheel 14 and the third gear wheel 16 comprise the same number of teeth, namely 16 teeth, and the second gear wheel 15 comprises the same number of teeth as is the case for the fourth gear wheel 17, namely 24 teeth. Therefore, this embodiment comprises a preferred speed reduction ratio of 0.444 . . . . Obviously also here other numbers of teeth and speed reduction ratios are possible as long as the gear 6 is a speed reduction gear.

The operation of this embodiment according to FIG. 3 is as follows: If the tape 19 is reeled off of reel 2 in the direction of the arrow 31, the rotation of the reel 2, which is connected to the shaft 13 at 34, causes shaft 13 to rotate in the same direction of rotation together with the fourth gear wheel 17 rigidly connected thereto. This fourth gear wheel 17 meshes with the first gear wheel 14, which first gear wheel 14 is rotatably supported in the casing 1 by the agency of shaft 10. Accordingly, this first gear wheel 14 rotates in the direction opposite to the direction of rotation of reel 2. Now, the second gear wheel 15 rotates in this same direction, which second gear wheel 15 is rigidly connected to the first gear wheel 14 as mentioned above. This second gear wheel 15 meshes with the third gear wheel 16, which consequently is rotated in a direction which again is the same direction in which the reel 2 rotates. Thereby, however, this third gear wheel 16 rotates with a smaller speed of rotation due to above explained speed reduction arrangement. The third gear wheel 16 is rigidly connected to the hub 29, which in turn is rigidly connected to the inner end 4 of the spiral spring 3, such that, such as is the case as described in FIG. 1, the inner end 4 of the spiral spring 3 rotates around the central axis 7 with a correspondingly smaller rotational speed. Accordingly, also this embodiment of FIG. 3 allows that the reel 2 can perform more revolutions in comparison with the prior art, according to which the inner end 4 of the spiral spring 3 is held rigidly until the spiral spring 3 is completely wound, which means until all single turns of the spiral spring 3 tightly abut each other. Consequently, also here it is possible to obtain a larger length of tape 19 or conversely, when maintaining a given length of the tape 19 to design a more compact device because the length of the spiral spring 3 can be reduced. The embodiment of FIG. 3 is specifically advantageous because the spiral spring 3 is arranged completely within the reel 2, which allows obviously an extremely compact arrangement.

Figure 4:
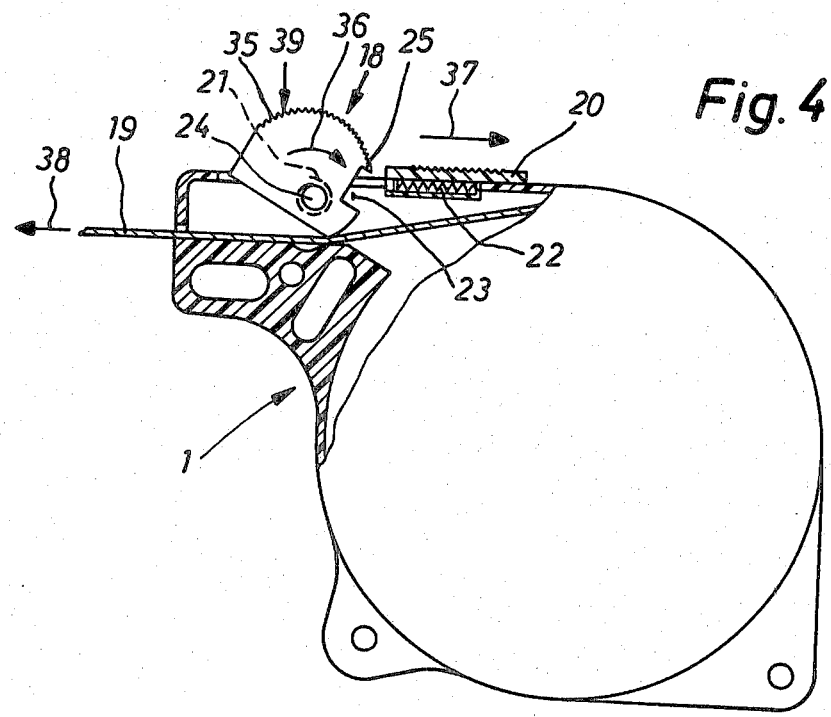
FIG. 4 is a sectional view of an embodiment, whereby the locking body is in its locking position.
Figure 5:
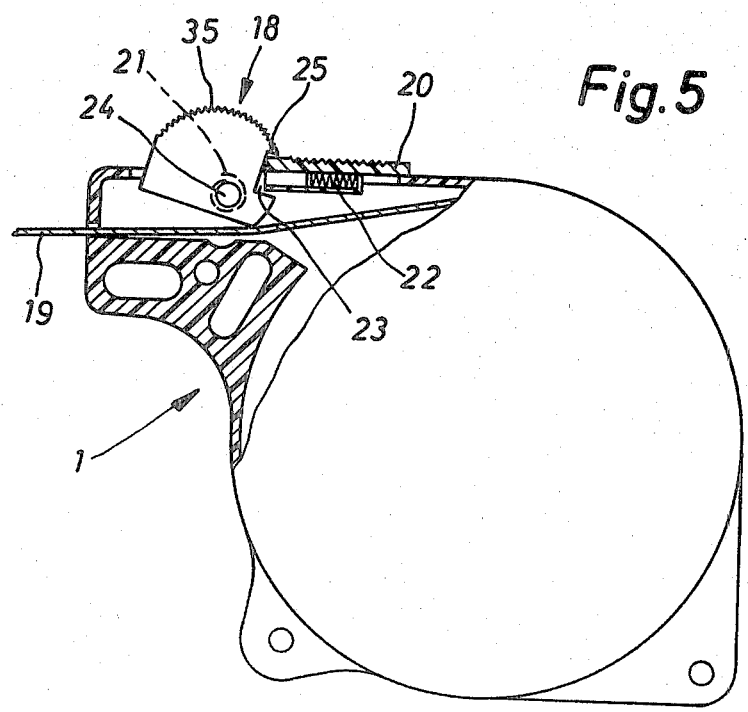
FIG. 5 is a sectional view of the embodiment shown in FIG. 4, whereby the locking body is locked in a release position by means of a sliding member.

Attention is now drawn to FIGS. 4 and 5. In order to lock tape 19 in any drawn out position, such that tape 19 will not be pulled by the operation of the spiral spring 3 again into the casing 1, there is provided a locking arrangement. To this end, a locking member 18 is eccentrically arranged on a supporting shaft 24, which supporting shaft 24 in turn is supported by casing 1. For ease of operation a section of the locking member 18 is knurled such as shown by 35. The locking member 18 is biassed by a spring 21 in a direction identified by means of the arrow 36 in FIG. 4. The locking member 18 is provided with a recess 23 at its circumference. A sliding member 20 is arranged in casing 1, which sliding member 20 is a plate reciprocable in its longitudinal direction. This sliding member 20 interacts with a compression spring 22, which biasses the sliding member 20 in the direction shown by means of the arrow 37, that is, the sliding member is biassed away from locking member 18.

In FIG. 4 the locking member 18 is shown in a position, according to which it engages into tape 19, whereby the locking member is biassed in this shown position by means of the spring 21. If now tape 19 is subjected to a pulling force acting in the direction of arrow 38, the eccentrically supported locking member 18 will be urged still stronger against the tape such that it no longer can be pulled out and accordingly is locked. However, the spring force of spring 21 of the locking member 18 is not that large, that it could act against the force exerted due to the spiral spring 3, such that the tape 19 cannot be reeled up, in other words it is locked in its pulled out state.

In FIG. 5 the released portion of the locking member 18 is shown. Thereby, the locking member 18 has been rotated counterclockwise (relative to FIG. 5) such that locking member 18 does no longer engage into the tape 19. Thereby the locking member 18 can be locked in turn in this released position by the sliding member 20. To this end, the sliding member 20 is moved into the recess 23 of the locking member 18. Because now the locking member 18 is biassed in the direction of arrow 37, the side flank portion 25 of the recess 23 abuts against the sliding member 20 exerting thereby a certain pressure force such that it is locked by the locking member 18 in turn. Obviously, the pressure force exerted at the flank portion 25 of the recess 23 is large enough to overcome the resetting force of the spring 22 of the sliding member 20.

The operation of the locking arrangement may be performed by means of the thumb only, whereby, obviously, the dimensions of the device are chosen to suit a human thumb. The base position, i.e. the locking position, of the locking member 18 is shown in FIG. 4. If now the tape 19 is to be pulled out in the direction of the arrow 38, the sliding member 20 will be moved by means of the thumb against the locking member 18, whereby the tip of the thumb acts against the knurled portion 35 of the locking member 18 such that it is rotated counterclockwise (based on the drawing) and such that the sliding member 20 can be moved into the recess 23, and accordingly, the locking member 18 is locked in its released position. Accordingly, the tape can be pulled out freely. In order to lock the tape the sliding member 20 must merely be pulled by means of the thumb in the direction of the arrow 37 or alternatively the locking member 18 can be rotated a little bit more by the tip of the thumb such that the locking action of the sliding member 20 is overcome because it will be shifted to the right by means of spring 22 such that the locking member 18 can rotate back into its locking position according to FIG. 4 upon release of the thumb.

If now the tape 19 shall be reeled up again on reel 2, the locking member 18 is again rotated counterclockwise (this can also be achieved by a pushing down at the portion 39 of the locking member 18) such that the locking member 18 will rotate into the position shown in FIG. 5 and thereby will release tape 19, which will be wound around reel 2 due to operation of the spiral spring 3 and accordingly will be pulled into the casing 1. When reeling up, it is not necessary to engage the sliding member 20 into the locking member 18, although this may be preferred when a rather long section of the tape 19 has been pulled out.

It is specifically to be noted that this design allows that the locking force acting onto the locked tape 19 acts directly onto the housing 1 and not onto the reel 2. In this way bearings, the gear, reel 2 and other members arranged inside the casing 1 are not subject to any force due to the locking action. Also, the extended length of the tape is infinitely variable.

While there are shown and described present preferred embodiments of the invention, it is to be distinctly understood that the invention is not limited thereto, but may be otherwise variously embodied and practiced within the scope of the following claims.

What is claimed is:

1. A winding and reeling device comprising
a casing,
a first shaft defining a central axis in said casing,
a toothless reel disposed to rotate about the central axis in said casing,
an elongated flexible member wound on said reel and having one end protruding out of said casing,
a spiral spring in said casing adapted to rotationally bias said reel in a take-up rotational direction,
said spiral spring having an inner end and an outer end,
said outer end being connected to said reel,
gear means in said casing operatively connected to the inner end of said spiral spring and being operatively connected to said reel,
said gear means including first and second gears rigidly connected to each other and each having a different number of teeth, a second shaft rigidly connected to said first and second gears and being journalled to said toothless reel eccentrically to said central axis, a third gear rigidly connected to said casing and meshing with said second gear, and a fourth gear meshing with said first gear and being rigidly connected to said first shaft,
said gear means upon rotation causing rotation of the outer end of said spiral spring at a first rotational speed and rotation of the inner end of said spiral spring at a slower second rotational speed,
the improvement being characterized in that
said first and third gears have a first number of teeth and said second and fourth gears have a second number of teeth larger than the first number of teeth, and
wherein a locking member is disposed exteriorly of said casing and is displaceable between a released position and a locking position, said locking member engaging the elongated flexible member in a drawn out position against the biassing force of said spiral spring to define its locking position, a notch in said locking member, and a sliding member movably carried by said casing for movement into said notch for locking said locking member in its released position.

2. The invention as claimed in claim 1 wherein the elongated flexible member comprises a dog leash which is extendable out of said casing.

3. The improved winding and reeling device of claim 1, wherein there is provided a first spring means arranged to bias said locking member into its locking position, and wherein there is provided a second spring means arranged to bias said sliding member away from said locking member.

4. The improved winding and reeling device of claim 1, wherein said locking member comprises a recess for receiving said sliding member, and wherein said sliding member protrudes into said recess when said locking member is in its release position.

5. The improved winding and reeling device of claim 1, wherein said locking member is supported by a supporting shaft which is arranged such that said locking member is eccentrically supported by said casing.

6. The improved winding and reeling device of claim 4, wherein said recess comprises a side flank section, whereby said locking member exerts in its release position via said flank section a pressure force onto said sliding member in order to lock said sliding member.

* * * * *